US008891144B2

(12) United States Patent
Luttmer

(10) Patent No.: US 8,891,144 B2
(45) Date of Patent: Nov. 18, 2014

(54) COLOR MANAGEMENT METHOD, MODULE, AND PROGRAM PRODUCT, AND PRINTER USING SAID METHOD

(75) Inventor: Maurice L. M. Luttmer, Velden (NL)

(73) Assignee: OCE-Technologies B.V., Venlo (NL)

( * ) Notice: Subject to any disclaimer, the term of this patent is extended or adjusted under 35 U.S.C. 154(b) by 957 days.

(21) Appl. No.: 12/418,751

(22) Filed: Apr. 6, 2009

(65) Prior Publication Data

US 2009/0251748 A1 Oct. 8, 2009

(30) Foreign Application Priority Data

Apr. 7, 2008 (EP) .................................. 08154135

(51) Int. Cl.
*G03F 3/08* (2006.01)
*H04N 1/60* (2006.01)
*G06K 9/00* (2006.01)

(52) U.S. Cl.
CPC ................................. *H04N 1/6025* (2013.01)
USPC .............................. 358/523; 358/1.9; 382/167

(58) Field of Classification Search
USPC .................................. 382/167, 165, 300, 277
See application file for complete search history.

(56) References Cited

U.S. PATENT DOCUMENTS

| | | | |
|---|---|---|---|
| 6,137,594 A | 10/2000 | Decker et al. | |
| 6,281,984 B1 | 8/2001 | Decker et al. | |
| 6,970,271 B1 * | 11/2005 | Estrada et al. ................. | 358/1.9 |
| 7,072,052 B1 * | 7/2006 | Tanahashi et al. ............. | 358/1.1 |
| 7,149,348 B1 * | 12/2006 | Borg .............................. | 382/162 |
| 7,511,714 B1 * | 3/2009 | Amann et al. ................. | 345/603 |
| 7,616,212 B2 * | 11/2009 | Inazumi ......................... | 345/582 |
| 8,035,654 B1 * | 10/2011 | Borg .............................. | 345/600 |
| 8,081,821 B1 * | 12/2011 | Schaem ......................... | 382/173 |
| 8,218,940 B2 * | 7/2012 | Sultenfuss et al. ............ | 386/232 |
| 2003/0234793 A1 * | 12/2003 | Stokes et al. .................. | 345/600 |
| 2005/0140694 A1 * | 6/2005 | Subramanian et al. ........ | 345/619 |
| 2006/0023234 A1 | 2/2006 | Kondo et al. | |
| 2006/0041609 A1 * | 2/2006 | Pellar ............................. | 708/290 |
| 2007/0014446 A1 * | 1/2007 | Sumanaweera et al. ...... | 382/128 |
| 2007/0018980 A1 * | 1/2007 | Berteig et al. ................. | 345/426 |
| 2007/0035752 A1 | 2/2007 | Evans et al. | |
| 2007/0058185 A1 * | 3/2007 | Kawai ............................ | 358/1.9 |
| 2007/0058224 A1 * | 3/2007 | Kawamoto et al. ........... | 358/518 |
| 2007/0086050 A1 * | 4/2007 | Matsuda ........................ | 358/1.15 |
| 2007/0091213 A1 * | 4/2007 | Jaspers ........................... | 348/687 |
| 2007/0098256 A1 * | 5/2007 | Kulkarni et al. ............... | 382/162 |
| 2007/0183644 A1 * | 8/2007 | Matsumoto .................... | 382/131 |
| 2008/0088858 A1 * | 4/2008 | Marcu et al. .................. | 358/1.6 |
| 2008/0089580 A1 * | 4/2008 | Marcu ........................... | 382/162 |
| 2008/0122860 A1 * | 5/2008 | Amann et al. ................. | 345/603 |
| 2008/0284877 A1 * | 11/2008 | Jaspers .......................... | 348/241 |
| 2008/0304738 A1 * | 12/2008 | Beilloin ......................... | 382/166 |
| 2009/0002379 A1 * | 1/2009 | Baeza et al. ................... | 345/522 |
| 2009/0027415 A1 * | 1/2009 | Dispoto et al. ................ | 345/604 |
| 2009/0067509 A1 * | 3/2009 | Poon ......................... | 375/240.26 |

(Continued)

*Primary Examiner* — Madelein A Nguyen

(74) *Attorney, Agent, or Firm* — Birch, Stewart, Kolasch & Birch, LLP

(57) ABSTRACT

A color management method, wherein a Graphics Processing Unit (GPU) is used for converting colors from a source device color space to an output device color space in accordance with predetermined color profiles of the source and output devices. The method includes the steps of storing, in the GPU, an at least three-dimensional conversion texture that specifies a color conversion table; loading input color data into the GPU; sampling the conversion texture at a position specified by the input color data, thereby to identify output color data; and outputting the output color data.

12 Claims, 4 Drawing Sheets

(56) References Cited

U.S. PATENT DOCUMENTS

| | | | |
|---|---|---|---|
| 2009/0080041 A1* | 3/2009 | Fan et al. | 358/518 |
| 2009/0080533 A1* | 3/2009 | Folta et al. | 375/240.25 |
| 2009/0174722 A1* | 7/2009 | Liang et al. | 345/582 |
| 2009/0252233 A1* | 10/2009 | Ji et al. | 375/240.25 |
| 2010/0026700 A1* | 2/2010 | Michail et al. | 345/582 |
| 2010/0214301 A1* | 8/2010 | Li et al. | 345/522 |
| 2011/0013833 A1* | 1/2011 | Hoof et al. | 382/167 |
| 2011/0149307 A1* | 6/2011 | Tin | 358/1.9 |
| 2011/0149327 A1* | 6/2011 | Furuya | 358/1.13 |
| 2011/0169844 A1* | 7/2011 | Diard et al. | 345/522 |
| 2011/0298819 A1* | 12/2011 | Evans et al. | 345/589 |
| 2012/0237120 A1* | 9/2012 | Kulkarni et al. | 382/162 |
| 2012/0287149 A1* | 11/2012 | Zimmer | 345/604 |

* cited by examiner

COLOR MANAGEMENT METHOD, MODULE, AND PROGRAM PRODUCT, AND PRINTER USING SAID METHOD

CROSS-REFERENCE TO RELATED APPLICATIONS

This application claims priority under 35 U.S.C. §119(a) to Application No. 08154135.1, filed in Europe on Apr. 7, 2008, the entirety of which is expressly incorporated herein by reference.

BACKGROUND OF THE INVENTION

1. Field of the Invention

The present invention relates to a color management method, wherein a Graphics Processing Unit (GPU) is used for converting colors from a source device color space to an output device color space in accordance with predetermined color profiles of the source and output devices.

The present invention further relates to a color management module and a program product embodied on a computer readable medium for implementing the method and to a printer using the method.

2. Description of Background Art

When a color image is scanned with a scanner and is then printed with a color printer, it can not be taken for granted that the colors on the printed copy will be identical with those of the original. The reason is that color processing devices such as scanners, printers and the like, operate in device dependent color spaces. The main purpose of color management is to transform one color space into another, given an input profile or source profile of the source device (e.g. scanner), an output profile of the output device (e.g. the printer) and possibly a rendering intent. The current standard for color management is set by the International Color Consortium (ICC) which has defined a format for the color profiles. For example, a color profile for a scanner may specify how the colors on an original, as defined in a standard color space such as LAB, for example, are related to the RGB colors output by the scanner. Similarly, a color profile of a printer may specify how the LAB colors that shall be visible on the printed copy are related to the CMYK color values to be input into the printer in order to achieve the desired output. In general, such a color profile is represented by two conversion tables, one mapping, for example, RGB onto LAB, and another one mapping LAB onto RGB (with suitable gamut mapping). When the scanner and the printer are combined to form a digital copier, the color managing module will perform a transformation that corresponds to concatenating the color profile of the scanner with the color profile of the printer.

Whereas color management has conventionally been the task of a CPU in a printer or other color processing device, U.S. Patent Application Publication No. 2007/0035752 A1 discloses a color management module in which at least a part of the color management operations are performed in a Graphics Processing Unit (GPU). Such a GPU is a processor with a massively parallel architecture that is typically employed in graphics cards in PCs. According to the color management method proposed in this document, the input color profile is at first linearized, if it is not linear already, and then a linear transformation, i.e. a matrix multiplication, is carried out, and, in general, a non-linear function is applied to the result in order to map the colors onto the output device color space.

SUMMARY OF THE INVENTION

It is an object of the present invention to provide a color management method that permits carrying out color conversion with improved efficiency and/or fidelity.

In order to achieve this object, the method according to the present invention is comprises the steps of: storing, in the GPU, an at least three-dimensional conversion texture that specifies a color conversion table; loading input color data into the GPU; sampling the conversion texture at a position specified by the input color data, thereby identifying output color data; and outputting the output color data.

In principle, the method according to the present invention is a table look-up method with interpolation, utilizing a conversion table that assigns a set (vector) of output color values in the output color space to every set of input color values in the source device color space. However, since existing GPUs support three-dimensional (3D) textures, the table look-up process can be performed in an extremely efficient way, when the conversion table is represented by such a 3D texture.

A texture in a GPU is comparable to an array in a conventional multi-purpose computer, with the main difference being that the texture can be addressed via floating point indices. Originally, GPUs and textures have mainly been used for rendering graphics art or a video for computer games and the like. In that case, the color value of a specific pixel to be rendered was determined by sampling a corresponding area in a texture that represents a two or three dimensional volume in which the virtual object exists to which the pixel belongs. However, according to the present invention, the textures do not represent a volume in a physical space but a volume in a color space, so that sampling the conversion texture at a position specified by the input color data is equivalent to looking-up, with interpolation, a value in a conversion table.

Since the GPU is specifically designed for efficiently carrying out tasks like sampling from textures, the present invention permits a highly efficient color management, regardless of whether the color profiles involved are linear or non-linear.

A color management module, a program product for color management and a printer using the method according to the present invention are specified in respective independent claims. More specific optional features of the present invention are indicated in the dependent claims.

In a preferred embodiment, a linear interpolation algorithm is used in sampling the conversion texture. Existing GPUs are well suited for that purpose.

When the source device has a three dimensional color space such as RGB, the conversion table can be stored in a 3D conversion texture. If the color space of the source device has four dimensions, such as CMYK, the conversion table can be represented by a (large) 3D texture that is divided into a plurality of cubes stacked one upon the other, and the fourth coordinate is represented by the number or index of the cube. For example, each cube may represent a CMY space for a specific value of K. Then, sampling the texture at the position of a specific CMYK color is performed by sampling the points CMY in the cubes for the two values of K that are closest to the K value of the input color. This results in two output colors, one for each of the two values of K, and the final output color is obtained by interpolation with respect to K.

Textures may also be used for storing the input color data and/or output color data in the GPU. Preferably, 1D or 2D textures are used for that purpose.

The color conversion may be performed in a single step, i.e. by means of a single conversion texture that integrates the color profiles of both, the source device and the output device. In a modified embodiment, however, the color conversion may be separated into a plurality of steps, using two or more conversion textures which may be obtained, for example, by converting the ICC profiles into textures.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
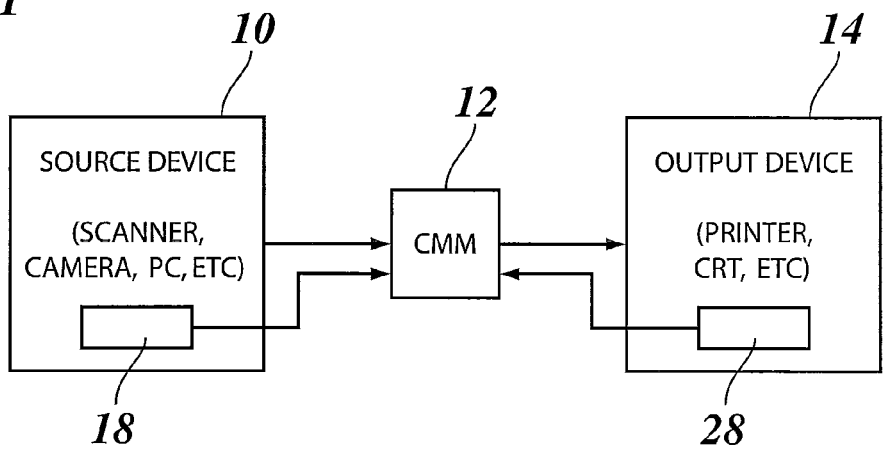
FIG. 1 is a block diagram of a color processing system.

The present invention will now be described with reference to the accompanying drawings, wherein the same reference numerals have been used to identify the same or similar elements throughout the several views.

FIG. 1 illustrates a source device 10, a color management module (CMM) 12 and an output device 14. The source device 10 may be any source of color information, e.g. a scanner that scans a physical object, a digital camera that takes a picture of a physical object, a PC or other multipurpose computer with data that represents a physical object and the like and might even be a virtual device represented by a file on a data carrier. The output device 14 may be any device that processes color information, e.g. a printer, a display such as a cathode ray tube (CRT), a plasma screen and the like, a beamer, and so on. Since each of the source and output devices 10, 14 have their own device-dependent color space, the CMM 12 is provided for converting the input colors delivered by the source device 10 from the color space of that source device into the color space of the output device 14.

Figure 2:
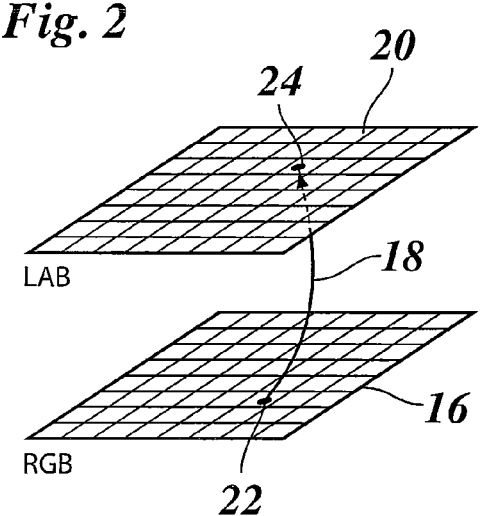
FIG. 2 is a diagrammatic illustration of a color profile of a source device.

The properties of the source device 10 can be characterized by a color profile (e.g. a standard ICC profile) as is schematically illustrated in FIG. 2. It is assumed here that the source device has a (three-) dimensional RGB color space 16. One of the three dimensions has been omitted for clarity in the drawing. A color profile 18 can be thought of as a function linking the color space 16 to a standard color space 20 (e.g. an LAB color space). Thus, every point 22 in the color space 16 is unambiguously mapped onto a point 24 in the color space 20. When the source device 10 is a scanner, for example, the point 24 in the LAB space 20 may be thought of as representing a color on an original that is scanned with the scanner, and the corresponding point 22 in the space 16 will indicate the corresponding RGB values output by the scanner.

Figure 3:
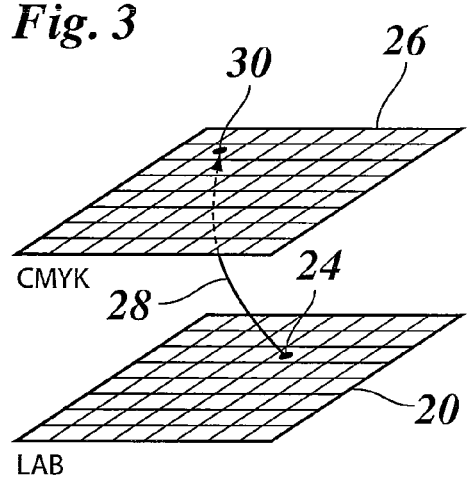
FIG. 3 is a diagrammatic illustration of a color profile of an output device.

Similarly, FIG. 3 illustrates a color profile 28 of the output device 14 that is assumed to have a four-dimensional CYMK color space 26. The color profile 28 may then be considered as a function linking any point in the standard LAB space 20, e.g. the point 24, to exactly one point 30 in the CMYK space 26.

Figure 4:
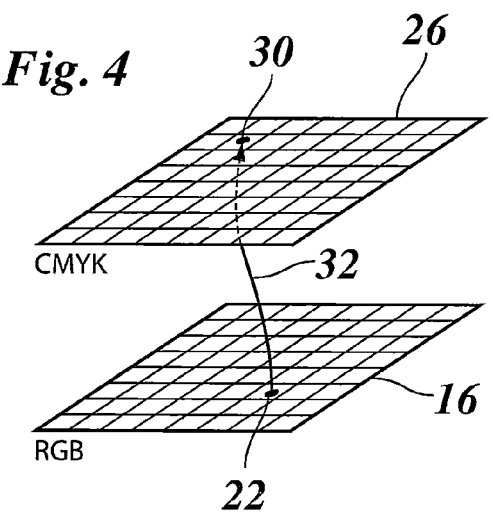
FIG. 4 is a diagrammatic illustration of a conversion function obtained by combining the color profiles of FIGS. 2 and 3.

As is shown in FIG. 4, the functions representing the color profiles 18 and 28 may be concatenated to form a conversion function 32 linking the RGB space 16 directly to the CMYK space 26. Such a function 32 is called a "device link" and is stored in the CMM 12 for converting the color signal output by the source device 10 into color signals to be supplied to the output device 14.

When the output device 14 is a printer, for example, and the source device 10 is again a scanner, then the color profiles 18 and 24 are ideally defined in such a way that the colors printed with the printer (by combining the colors CMYK) will be identical with the colors on the original that have been scanned with the scanner. More generally, the color profile 28 of the output device indicates the CMYK values to be supplied to the output device in order to obtain, as output, the desired color in the standard LAB space.

Figure 5:
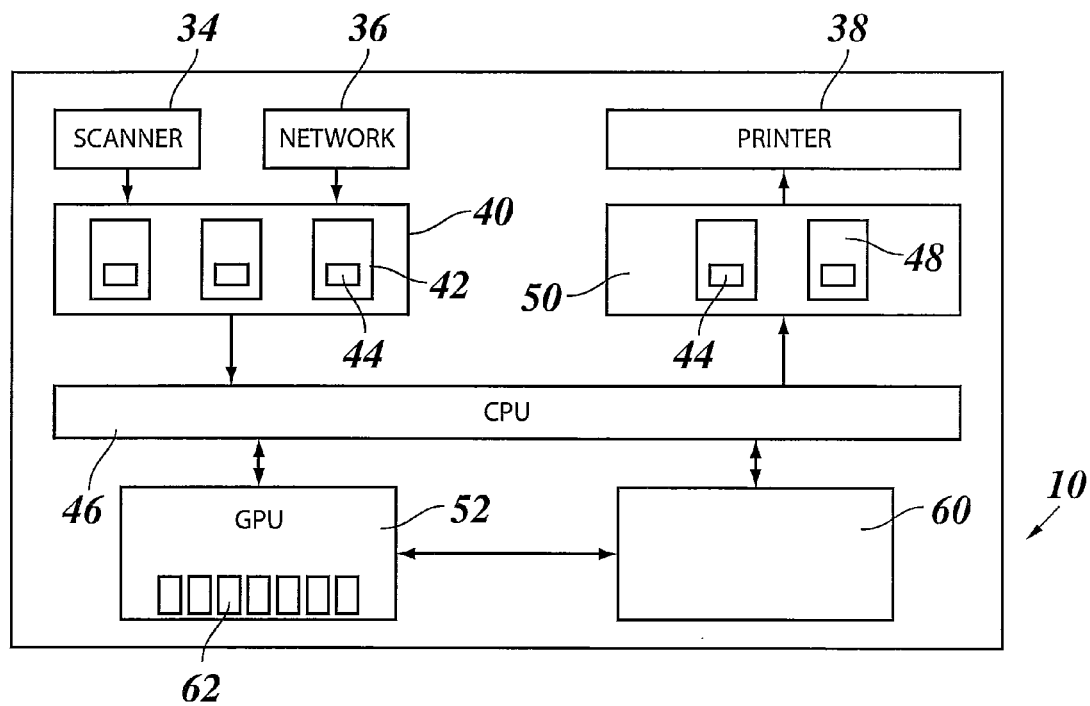
FIG. 5 is a block diagram of a digital copier or multi-purpose device having a color management module according to the present invention.

FIG. 5 illustrates the general layout of a digital printer/copier or multi-purpose device comprising a local scanner 34 as a first source device, a network unit 36 for connecting to other source devices, and a print engine (printer) 38 as the output device.

A memory 40 stores input files 42 that have been created with the scanner 34 or have been received via the network. Each input file 42 may be in a specific format, e.g. PostScript or the like, and may include a color list 44 listing the colors that occur in the image, so that a color value can be assigned to each element (e.g. pixel) of the image. The colors in the color list 44 will be given in the color space 16 of the respective source device.

When an input file is to be printed with the print engine 38, this file will be converted under the control of a CPU 46 into a print file 48 that will be stored in a memory 50 and will then be fed to the print engine 38. This conversion includes color management, so that the color lists 44 of the print files 48 now contain converted colors which are defined in the color space 26 of the print engine 38. For that purpose, the system includes a color management module which, in this example, is not mainly implemented in the CPU 46 but is formed by a Graphics Processing Unit (GPU) 52 that communicates with the CPU 46.

Both the CPU and the GPU have access to a memory 60 that is used by the GPU for storing 1D, 2D and 3D textures. As has only symbolically been shown in FIG. 5, the GPU comprises a large number of processors 62 which work in parallel for carrying out operations on the data in the memory 60.

Figure 6:
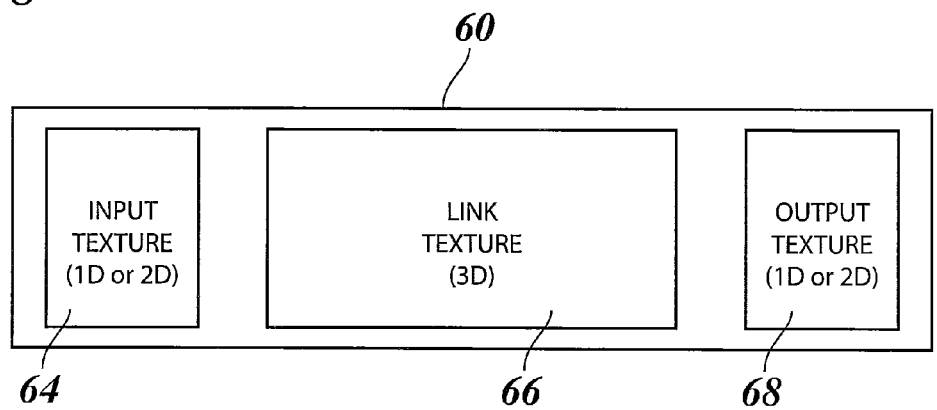
FIG. 6 is a block diagram of a memory.

As is shown in FIG. 6, the textures in the memory 60 comprise a one- or two-dimensional input texture 64, a three-dimensional link texture 66 and an output texture 68 which has again one or two dimensions. In a modified embodiment, an off-screen framebuffer may be provided in place of the output texture 68.

In order to perform color management for a specific input file 42, the input color data included in the color list 44 will be loaded into the input texture 64. A three-dimensional conversion table representing the conversion function 32 (FIG. 4) has previously been stored in the link texture 66. Then, in order to perform the color conversion, the processors 42 operate in parallel on the individual pixels in the image represented by the input file 42 to convert the color thereof. Each pixel is processed in a separate thread, in which a specific program, that is called pixel shader, fetches the input color value for the pertinent pixel from the input texture 64 and treats the three color components as coordinates (possibly with a suitable scaling), which specify a certain point in the link texture 66. The entry at the corresponding point in the link texture is sampled with linear interpolation between the eight closest values in the conversion table. The result is then stored in the output texture 68 and sent back to the CPU 46.

When another input file 42 is to be processed, which originates from a different source device having a different color profile, then, of course, the conversion table in the link texture 66 has to be modified. A new conversion table will be calculated (e.g. in the CPU 46) and will then be loaded into the link texture 66. Similarly, different color profiles may be provided for the print engine 38. These color profiles may, for example, depend on the type of recording medium that is to be printed on, and on the halftone screens that are used for color printing. In a specific embodiment, there may, for example, be six different output profiles corresponding to three different halftone screens for coated and uncoated paper, respectively.

Figure 7:
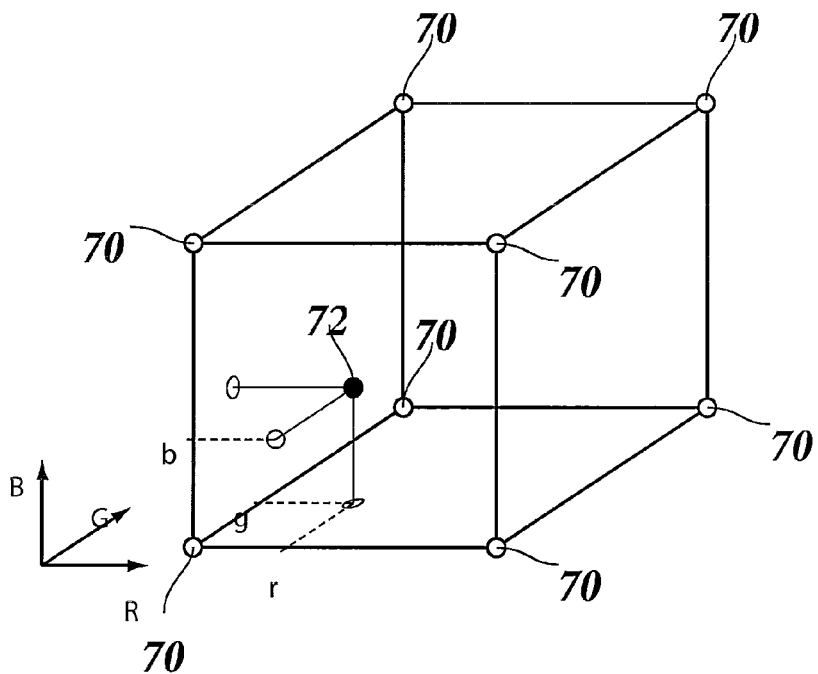
FIG. 7 is a diagram illustrating the process of sampling a 3D texture.

The process of sampling a value from the link texture 66 will now be explained in conjunction with FIG. 7. Although it was stated that a 3D texture can be addressed with (three) floating point indices, so that the texture can practically be treated as a continuum, of course, only a finite number of entries (CMYK output values) can actually be stored in the texture. This is why the texture can be imagined as a cubic grid in the RGB space, where an entry (CMYK value) is present for each node of the grid. FIG. 7 illustrates an individual cube of this grid with eight nodes 70. Every point 72 in the RGB space, specified by its co-ordinates (r, g, b) is located within a certain cell or cube of the grid, and the corresponding CMYK output color value is obtained by applying a known interpolation algorithm, e.g. linear interpolation, to the CMYK values that are stored in the texture for the eight nodes 70 at the corners of that cell.

The same sampling procedure can be applied to any three dimensional color space such as LAB, XYZ, and the like, and the entries at the nodes 70 may not only be CMYK values but could also be co-ordinates of another three-, four-, or higher-dimensional color spaces such as LAB, XYZ or again RGB.

Figure 8:
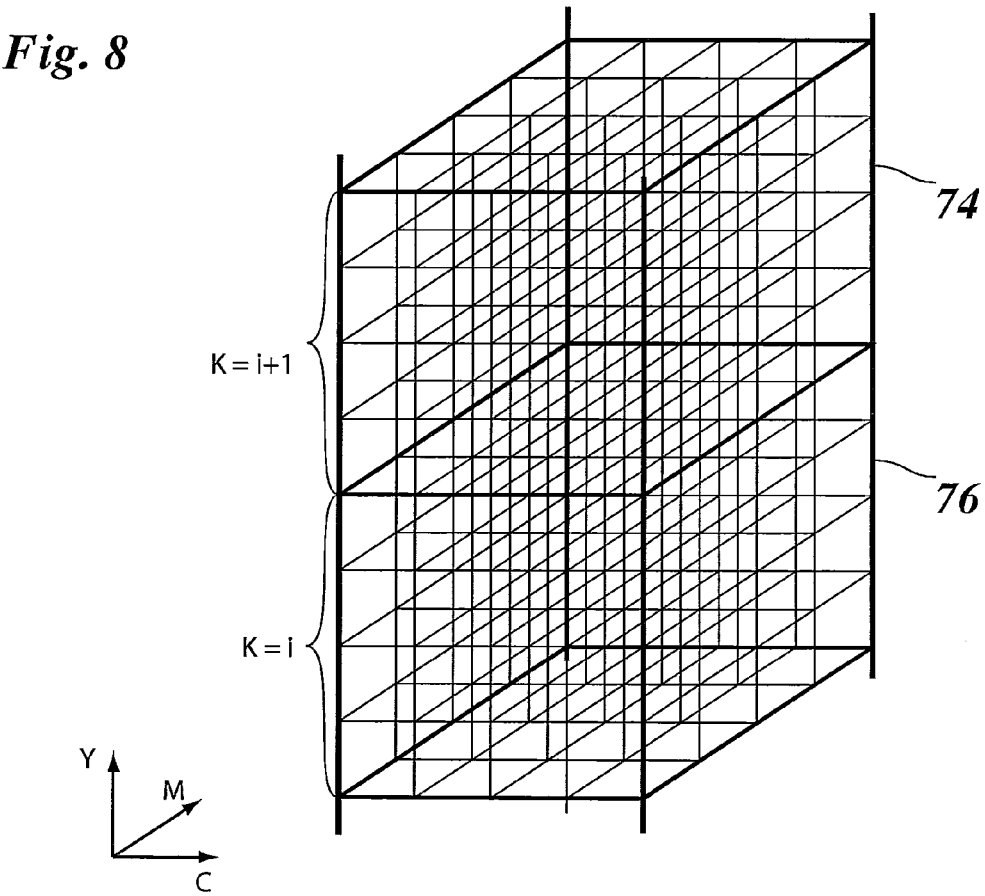
FIG. 8 illustrates the representation of a 4D conversion table in a 3D texture.

Some special considerations are necessary for cases where the color space of the source device 10 is a four-dimensional space such as CMYK. Then, in analogy to what has been explained in conjunction with FIG. 7, a 4D texture would be needed, which, however, is not supported by existing GPUs. For that reason, the fourth dimension is represented in a 3D texture by stacking a number of CMY cubes, one for each discrete K value, upon one another. FIG. 8 illustrates a simplified example with two 4×4×4 CMY cubes 74, 76 stacked upon one another. The lower cube 76 contains the output color values for a certain value i of the fourth co-ordinate K, and the upper cube 74 contains the output color values for K=i+1. For simplicity, i is considered here as an integer, although, in practice, it will generally be a floating point number running from 0 to 1. Moreover, in a practical example, the cubes 74, 76 would have a size of 16×16×16 cells (corresponding to $17^3$ discrete output color values), and 17 of such cubes, one for each of 17 different K values, would be stacked in the texture. Thus, if K runs from 0 to 1, the index i would designate intervals with a size of $1/17$.

When an output color value is sampled in the "virtual 4D texture" at a certain point having the CMYK co-ordinates (c, m, y, k), the co-ordinate k determines which of the 17 cubes are evaluated. If k is between i and i+1, then, the cubes 74 and 76 shown in FIG. 8 would be evaluated. In the manner that has been described in conjunction with FIG. 7, separate output values would be sampled for each of the cubes 74, 76, and then the final output value would be found from these two results by linear interpolation with respect to k.

Figure 9:
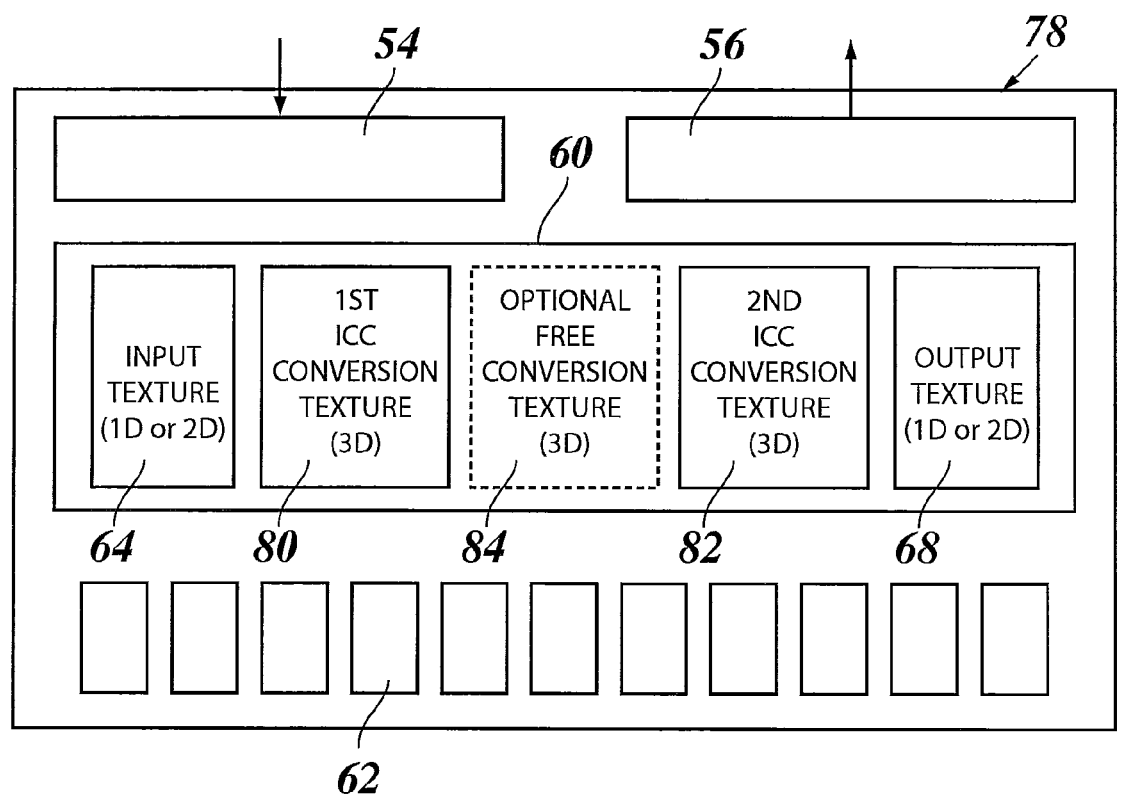
FIG. 9 is a block diagram of a GPU, similar to FIG. 6, for a modified embodiment of the present invention.

In the examples that have been described above, it was assumed that the GPU stores only a single link texture 66 at a time, this link texture containing a conversion table that may correspond to the concatenated conversion function 32 in FIG. 4, for example. However, in a modified embodiment, shown in FIG. 9, the conversion may also be performed in two or more steps, employing a separate conversion texture for each step. By way of example, FIG. 9 shows a GPU 78, wherein the memory 60 stores, in addition to the input texture 64 and the output texture 68, a first conversion texture 80 and a second conversion texture 82. The first conversion texture 80 may, for example, represent the standard ICC color profile of the source device 10, whereas the second conversion texture 82 may represent the ICC color profile of the output device 14. Then, the conversion will be performed in two steps: a first step of sampling the first conversion texture 80 at a point specified by the input color value, and a second step of sampling the second conversion texture 82 at a point specified by the result of the first sampling step. Then, when a source device 10 or an output device 14 is to be replaced, the color managing module 12 can easily be adapted by replacing the corresponding conversion texture 80 and 82, respectively, by one that represents the color profile of the new device.

Optionally, a third conversion texture 84 may be intervening between the textures 80 and 82. This conversion texture 84 would map the standard color space (e.g. LAB) back onto itself and may represent transformations that may freely be selected by the user in order to optimize the result. Since these transformations are performed in the standard color space, they will largely be device-independent.

Finally it is noted that a GPU nowadays most of the time is embodied as a separate integrated circuit or chip, separate from a CPU and other circuitry. However, it is also envisaged that a GPU will be integrated with a CPU and possibly other circuitry on a single substrate and so forming a single chip. Besides that, a GPU may also be embodied in a PLA (Programmable Logic Array) or in a ASIC (Application Specific Integrated Circuit). The notion of GPU as used in this description encompasses, but is not limited to, the embodiments given above.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A color management method, wherein a Graphics Processing Unit (GPU) is used for converting colors from a source device color space to an output device color space in accordance with predetermined color profiles of the source and output devices, said method comprising the steps of:
   storing, in the GPU, a first conversion texture representing an ICC color profile of the source device, a second conversion texture representing an ICC color profile of the output device, and a third conversion texture intervening between the first conversion texture and the second conversion texture;

loading input color data into the GPU;

sampling the input color data, in the GPU, using the first conversion texture, the second conversion texture and the third conversion texture, thereby identifying output color data, wherein the third conversion texture is device-independent and performs transformation to optimize conversion of the input color data into the output color data; and outputting the output color data.

2. The method according to claim 1, wherein said sampling step further comprises the step of interpolating between entries in a correspond one of the first, second and third conversion textures.

3. The method according to claim 1, wherein the source device color space has four dimensions, the first conversion texture stored in the GPU represents a stack of a plurality of three-dimensional sub-spaces, each for a different value of a fourth co-ordinate of the source device color space, and the sampling step for a point with a specific value of the fourth co-ordinate further comprises the steps of sampling the two sub-spaces closest to the specific value of the fourth co-ordinate and then interpolating between the results.

4. The method according to claim 1, further comprising the step of loading a set of input color data into an at least one-dimensional texture in the GPU.

5. The method according to claim 1, further comprising the step of storing the sampled results in an at least one-dimensional texture of the GPU or in a frame buffer.

6. The method according to claim 1, wherein the source device color space is a three-dimensional color space and the output device color space is a four-dimensional color space.

7. A color management module comprising:
a Graphics Processing Unit (GPU) used for converting colors from a source device color space to an output device color space in accordance with predetermined color profiles of the source and output devices, said GPU being configured to perform a color management method comprising the steps of:

storing, in the GPU, a first conversion texture representing an ICC color profile of the source device, a second conversion texture representing an ICC color profile of the output device, and a third conversion texture intervening between the first conversion texture and the second conversion texture;

loading input color data into the GPU;

sampling the input color data, in the GPU, using the first conversion texture, the second conversion texture and the third conversion texture, thereby identifying output color data, wherein the third conversion texture is device-independent and performs transformation to optimize conversion of the input color data into the output color data; and outputting the output color data.

8. A printer comprising the color management module according to claim 7.

9. The printer according to claim 8, configured as a printer/copier with a print engine and a scanner.

10. The color management module according to claim 7, wherein the source device color space is a three-dimensional color space and the output device color space is a four-dimensional color space.

11. A computer program product including program code on a non-transitory computer readable medium that, when run on a Graphics Processing Unit (GPU) used for converting colors from a source device color space to an output device color space in accordance with predetermined color profiles of the source and output devices, causes the GPU to perform a color management method comprising the steps of:

storing, in the GPU, a first conversion texture representing an ICC color profile of the source device, a second conversion texture representing an ICC color profile of the output device, and a third conversion texture intervening between the first conversion texture and the second conversion texture;

loading input color data into the GPU;

sampling the input color data, in the GPU, using the first conversion texture, the second conversion texture and the third conversion texture, thereby identifying output color data, wherein the third conversion texture is device-independent and performs transformation to optimize conversion of the input color data into the output color data; and outputting the output color data.

12. The computer program product including the program code on the non-transitory computer readable medium according to claim 11, wherein the source device color space is a three-dimensional color space and the output device color space is a four-dimensional color space.

* * * * *